(12) United States Patent
Guo et al.

(10) Patent No.: US 10,305,815 B2
(45) Date of Patent: May 28, 2019

(54) SYSTEM AND METHOD FOR DISTRIBUTED RESOURCE MANAGEMENT

(71) Applicant: HUAWEI TECHNOLOGIES CO., LTD., Shenzhen (CN)

(72) Inventors: Lei Guo, Markham (CA); Chong Chen, Richmond Hill (CA); Xiaodi Ke, Markham (CA); Jason T. S. Lam, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 15/142,029

(22) Filed: Apr. 29, 2016

(65) Prior Publication Data

US 2017/0317945 A1     Nov. 2, 2017

(51) Int. Cl.
*H04L 12/24* (2006.01)
*H04L 29/08* (2006.01)
*H04L 12/911* (2013.01)

(52) U.S. Cl.
CPC ............ *H04L 47/70* (2013.01); *H04L 41/042* (2013.01); *H04L 41/046* (2013.01); *H04L 67/1012* (2013.01); *H04L 67/1097* (2013.01); *H04L 67/327* (2013.01)

(58) Field of Classification Search
None
See application file for complete search history.

(56) References Cited

U.S. PATENT DOCUMENTS

| | | |
|---|---|---|
| 2005/0076043 A1 | 4/2005 | Benedetti et al. |
| 2005/0125388 A1* | 6/2005 | Karve ............... G06F 17/30501 |
| 2008/0103861 A1 | 5/2008 | Zhong et al. |
| 2008/0263208 A1 | 10/2008 | White |
| 2012/0215924 A1 | 8/2012 | Tameshige et al. |
| 2012/0239811 A1* | 9/2012 | Kohli .................. H04L 67/2814 709/226 |
| 2013/0151707 A1 | 6/2013 | Boutin et al. |
| 2015/0304438 A1* | 10/2015 | Kawamatsu ............ H04L 67/26 709/203 |
| 2015/0358402 A1 | 12/2015 | Stolyar et al. |
| 2016/0286165 A1* | 9/2016 | Sorokin .............. H04L 43/0852 |
| 2016/0294934 A1* | 10/2016 | Kirubanandam ......... G06F 9/00 |
| 2017/0264493 A1* | 9/2017 | Cencini ................. H04L 41/044 |
| 2017/0346901 A1* | 11/2017 | Vas ..................... H04L 67/1097 |
| 2018/0063021 A1* | 3/2018 | Beveridge ................ G06F 9/50 |

FOREIGN PATENT DOCUMENTS

| | | | | |
|---|---|---|---|---|
| CN | 101873592 A | 10/2010 | | |
| CN | 102945161 A | 2/2013 | | |
| CN | 103617472 A | 3/2014 | | |
| EP | 3073732 A1 * | 9/2016 | ......... | H04L 43/0852 |
| WO | 03023665 A1 | 3/2003 | | |
| WO | 2015163864 A1 | 10/2015 | | |

* cited by examiner

*Primary Examiner* — Brian Whipple
(74) *Attorney, Agent, or Firm* — Norton Rose Fulbright Canada LLP

(57) ABSTRACT

Methods and systems of managing a resource in a distributed resource management system can include: receiving a resource request including data identifying at least one requested resource attribute; identifying one or more candidate resources from a plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling a workload associated with the resource request for execution based on the one or more identified candidate resources.

20 Claims, 16 Drawing Sheets

| Rack 1 | Rack 2 |
|---|---|
| Host1 (power on, 128G memory, 2 CPU, 1 GPU) | Host5 (power on, 64G memory, 2 CPU, 1 GPU) |
| Host2 (power off, 128G memory, 2 CPU, 1 GPU) | Host6 (power on, 64G memory, 2 CPU, 1 GPU) |
| Host3 (power on, 64G memory, 2 CPU) | Host7 (power on, 64G memory, 2 CPU) |
| Host4 (power on, 64G memory, 2 CPU) | Host8 (power off, 64G memory, 2 CPU) |

| Power-On | 1 |
|---:|---|
| Large Memory | 1 |
| With GPU | 1 |
| Rack1 | 1 |
810
820
| Resource Name | Resource Information |
|---|---|
| Host1 | Power=on, Memory=128G, CPU=2, GPU=1, Rack=Rack1, ServerIndex=1 |
| Rack1 | rackIndex=1 |
840
nextServerIndex=2
nextRackIndex=2
FIG. 10

*810*

| Power-On | 1 | 0 |
| --- | --- | --- |
| Large Memory | 1 | 1 |
| With GPU | 1 | 1 |
| Rack1 | 1 | 1 |

*820*

| Resource Name | Resource Information |
| --- | --- |
| Host1 | Power=on, Memory=128G, CPU=2, GPU=1, Rack=Rack1, ServerIndex=1 |
| Rack1 | rackIndex=1 |
| Host2 | Power=off, Memory=128G, CPU=2, GPU=1, Rack=Rack1, ServerIndex=2 |

*840* nextServerIndex=3
nextRackIndex=2

| Power-On | 1 | 0 | 1 | 1 | 1 | 1 | 1 | 0 |
|---|---|---|---|---|---|---|---|---|
| Large Memory | 1 | 1 | 0 | 0 | 0 | 0 | 0 | 0 |
| With GPU | 1 | 1 | 0 | 0 | 1 | 1 | 0 | 0 |
| Rack1 | 1 | 1 | 1 | 1 | 0 | 0 | 0 | 0 |
| Rack2 | 0 | 0 | 0 | 0 | 1 | 1 | 1 | 1 |

820

| Resource Name | Resource Information |
|---|---|
| Host1 | Power=on, Memory=128G, CPU=2, GPU=1, Rack=Rack1, ServerIndex=1 |
| Rack1 | rackIndex=1 |
| Host2 | Power=off, Memory=128G, CPU=2, GPU=1, Rack=Rack1, ServerIndex=2 |
| Host3 | Power=on, Memory=64G, CPU=2, Rack=Rack1, ServerIndex=3 |
| Host4 | Power=on, Memory=64G, CPU=2, Rack=Rack1, ServerIndex=4 |
| Host5 | Power=on, Memory=64G, CPU=2, GPU=1, Rack=Rack2, ServerIndex=5 |
| Rack2 | rackIndex=2 |
| Host6 | Power=on, Memory=64G, CPU=2, GPU=1, Rack=Rack2, ServerIndex=6 |
| Host7 | Power=on, Memory=64G, CPU=2, Rack=Rack2, ServerIndex=7 |
| Host8 | Power=off, Memory=64G, CPU=2, Rack=Rack2, ServerIndex=8 |

840 nextServerIndex=9
nextRackIndex=3

FIG. 12

| Power-On | 1 | 0 | 1 | 1 | 1 | 1 | 1 |
|---|---|---|---|---|---|---|---|
| Large Memory | 1 | 0 | 0 | 0 | 0 | 0 | 0 |
| With GPU | 1 | 0 | 0 | 0 | 1 | 1 | 0 |
| Rack1 | 1 | 0 | 1 | 1 | 0 | 0 | 0 |
| Rack2 | 0 | 1 | 0 | 0 | 1 | 1 | 1 |

810x

| Resource Name | Resource Information |
|---|---|
| Host1 | Power=on, Memory=128G, CPU=2, GPU=1, Rack=Rack1, ServerIndex=1 |
| Rack1 | rackIndex=1 |
| Host3 | Power=on, Memory=64G, CPU=2, Rack=Rack1, ServerIndex=3 |
| Host4 | Power=on, Memory=64G, CPU=2, Rack=Rack1, ServerIndex=4 |
| Host5 | Power=on, Memory=64G, CPU=2, GPU=1, Rack=Rack2, ServerIndex=5 |
| Rack2 | rackIndex=2 |
| Host6 | Power=on, Memory=64G, CPU=2, GPU=1, Rack=Rack2, ServerIndex=6 |
| Host7 | Power=on, Memory=64G, CPU=2, Rack=Rack2, ServerIndex=7 |
| Host8 | Power=off, Memory=64G, CPU=2, Rack=Rack2, ServerIndex=2 |

820x

840x nextServerIndex=8
nextRackIndex=3

1330x

| | | | | | | | |
|---|---|---|---|---|---|---|---|
| Request for node with data (Host1, Host8) | 1 | 1 | 0 | 0 | 0 | 0 | 0 |
| Request for rack close to data (Rack1 and Rack2) | 1 | 1 | | | | | |
| Request for special resource | 0 | 1 | | | | | |
| Blacklist | 0 | 0 | 1 | 0 | 0 | 1 | 0 |

FIG. 14

SYSTEM AND METHOD FOR DISTRIBUTED RESOURCE MANAGEMENT

FIELD

This disclosure relates to workload management systems, and more particularly, to systems, devices, methods and computer-readable media for resource management.

BACKGROUND

In computing environments such as cloud computing, servers, or other systems or devices, workload management systems can be used to manage workload scheduling and the allocation of resources.

Different workloads may have different resource and location requirements which must be accommodated by the workload management system. Scheduling decisions can affect performance metrics such as workload throughput, resource utilization rates, and workload runtimes.

As the computing environment and the volume of workloads scales, workload scheduling itself can become a large, time-consuming process. Scheduling resources efficiently without large performance trade-offs can be a challenge.

SUMMARY

In some situations, some embodiments of the present disclosure may reduce scheduling time by reducing the number of candidate resources in consideration during scheduling, while still evaluating the suitability of all or a significant number of resources in the system.

In accordance with one aspect of the present disclosure, there is provided a method for managing resources in a distributed resource management system. The method includes: receiving a resource request by at least one processor in the distributed resource management system, the resource request including data identifying at least one requested resource attribute; identifying one or more candidate resources from a plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling a workload associated with the resource request for execution based on the one or more identified candidate resources.

In accordance with another aspect of the present disclosure there is provided a system comprising: at least one processor for managing resources. The at least one processor is configured for: receiving a resource request including data identifying at least one requested resource attribute; identifying one or more candidate resources from a plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling a workload associated with the resource request for execution based on the one or more identified candidate resources.

In accordance with another aspect of the present disclosure there is provided a non-transitory, computer-readable medium or media having stored thereon computer-readable instructions. The instructions, which when executed by at least one processor, configure the at least one processor for: receiving a resource request including data identifying at least one requested resource attribute; identifying one or more candidate resources from a plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling a workload associated with the resource request for execution based on the one or more identified candidate resources.

Many further features and combinations thereof concerning the present improvements will appear to those skilled in the art following a reading of the instant disclosure.

DESCRIPTION OF THE FIGURES

FIGS. 10-14 are diagrams showing examples of distributed resource management data.

These drawings depict aspects of example embodiments for illustrative purposes. Variations, alternative configurations, alternative components and modifications may be made to these example embodiments.

DETAILED DESCRIPTION

With the increased use of social media, online business, wearable devices, Internet of Things and cloud systems, the growth of data is significantly increasing. The International Data Corporation predicts the world's data will grow 50× between 2010 and 2020, 80% of which will be non-structured. Distributed storage systems and distributed cache systems are used in some data intensive environments to store unstructured data due to lower costs relative to centralized storage systems.

The management and operation of big data analytics on this data, such as in a distributed resource computing system, can affect the time and cost required to perform the data analytics. In a computing environment having distributed resources, data analytics applications or processes can be executed as workloads in a distributed resource management system.

Workloads handled by a distributed resource management system can have different resource requirements. In some embodiments, a resource request for a workload can include one or more requested resource attributes as part of the resource request. For example, a resource request for a workload may include a resource attribute indicating that the workload requires a graphics processing unit (GPU) or will be accessing data at a particular location in the computing environment.

In some embodiments, a scheduler in the distributed resource management system may exhaustively search all resources in the computing environment to identify the best-suited resources for the request. However, as a computing environment scales, for example, to thousands of resources potentially having different hardware, software, locations, statuses, etc., the search space and the time required to search and consider all resources may grow considerably.

In some embodiments, aspects of the present disclosure provide systems, methods and media for scheduling a workload for execution on one or more resources which, in some instances, may balance scheduling efficiency and performance.

Figure 1:
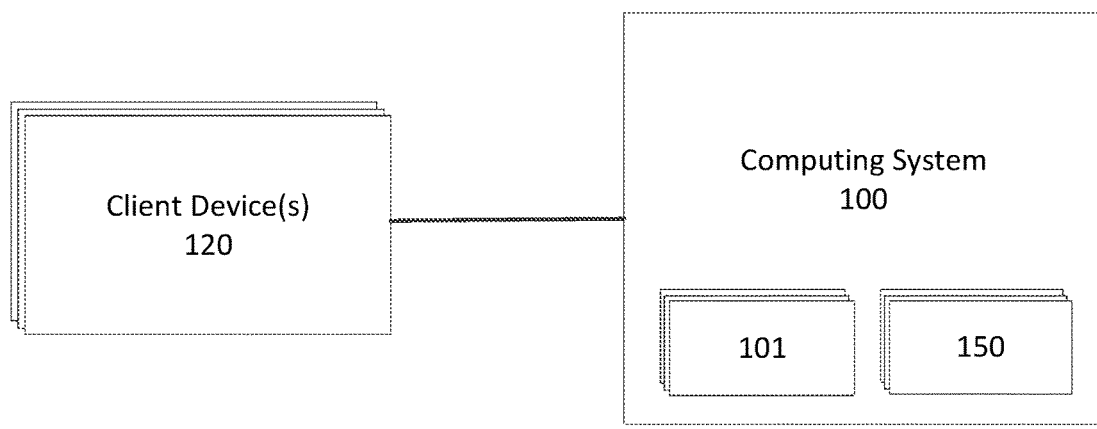
FIG. 1 is a diagram showing aspects of an example computing environment.

FIG. 1 illustrates aspects of an example computing environment 10 to which aspects of the present disclosure can be applied. In the computing environment 10, one or more client devices 120 can connect to a computing system 100 to access or otherwise utilize one or more resources in the computing system 100.

In some embodiments, the computing system 100 can include any combination of hardware and software components. For example, a computing system 100 may include a combination of computing devices, processors, networks, memories, storage devices, network devices, power sources, license servers (e.g., software license servers), swap space, and the like. In some embodiments, the computing system 100 may be a heterogeneous or a homogenous environment, and may have different or similar hardware components running different or similar operating systems.

In some embodiments, the computing system 100 may be a single device physically or logically, such as a single computing device or a single server having one or more resources.

The computing system 100 can include one or more resources 150 which can be shared between, or otherwise utilized by, multiple workloads. Some resources 150 may be physically or logically associated with a single device, and other resources 150 may be shared resources which may be utilized by multiple devices in the computing system 100. In some embodiments, resources 150 in the computing system 100 can have or otherwise be associated with one or more attributes. In some embodiments, attributes can include resource type or class, resource state/status, resource location, resource identifier/name, resource value, resource capacity, resource capabilities, or any other resource information that can be used as criteria for selecting or identifying a suitable resource.

Irrespective of the number or configuration of devices, networks, hardware, software and/or other resources in the computing system 100, in some embodiments, the computing system 100 may be configured to appear as a single image or interface to the client devices 120. The computing system 100 can be configured to run workloads from the client devices 120 and from components of the computing system 100 itself.

The computing system 100 may include one or more processors 101 in a single device or split across any number of devices in the computing system 100. These processors 101 can be configured to manage the resources 150 in the computing system 100.

The computing system 100 can be configured as a distributed resource management (DRM) system. In some embodiments, the DRM system is an infrastructure middleware which can run on top of a distributed environment. The distributed environment can include different kinds of hardware and software.

The DRM system may be implemented by one or more processors 101 in one or more devices in the computing system 100. In some embodiments, the DRM system can provide a single system image to client devices 120, and can handle resource management, workload management and scheduling. Workloads can refer to any process, job, service, or any other computing task to be run on the computing system 100. For example, workloads may include batch jobs (e.g., high performance computing (HPC) batch jobs), Message Passing Interface (MPI) processes, serial and/or parallel batch tasks, real time analytics, elastic applications (e.g., MapReduce), long running services, virtual machines, containers, etc.

Aspects of the present disclosure may be applied to various DRM systems such as the IBM™ Platform Load Sharing Facility (LSF), Apache™ Hadoop, YARN (Yet Another Resource Negotiator), PBS (Portable Batch Scheduler), OpenStack™, Huawei™ FusionSphere, FusionCube and FusionInsight.

Figure 2:
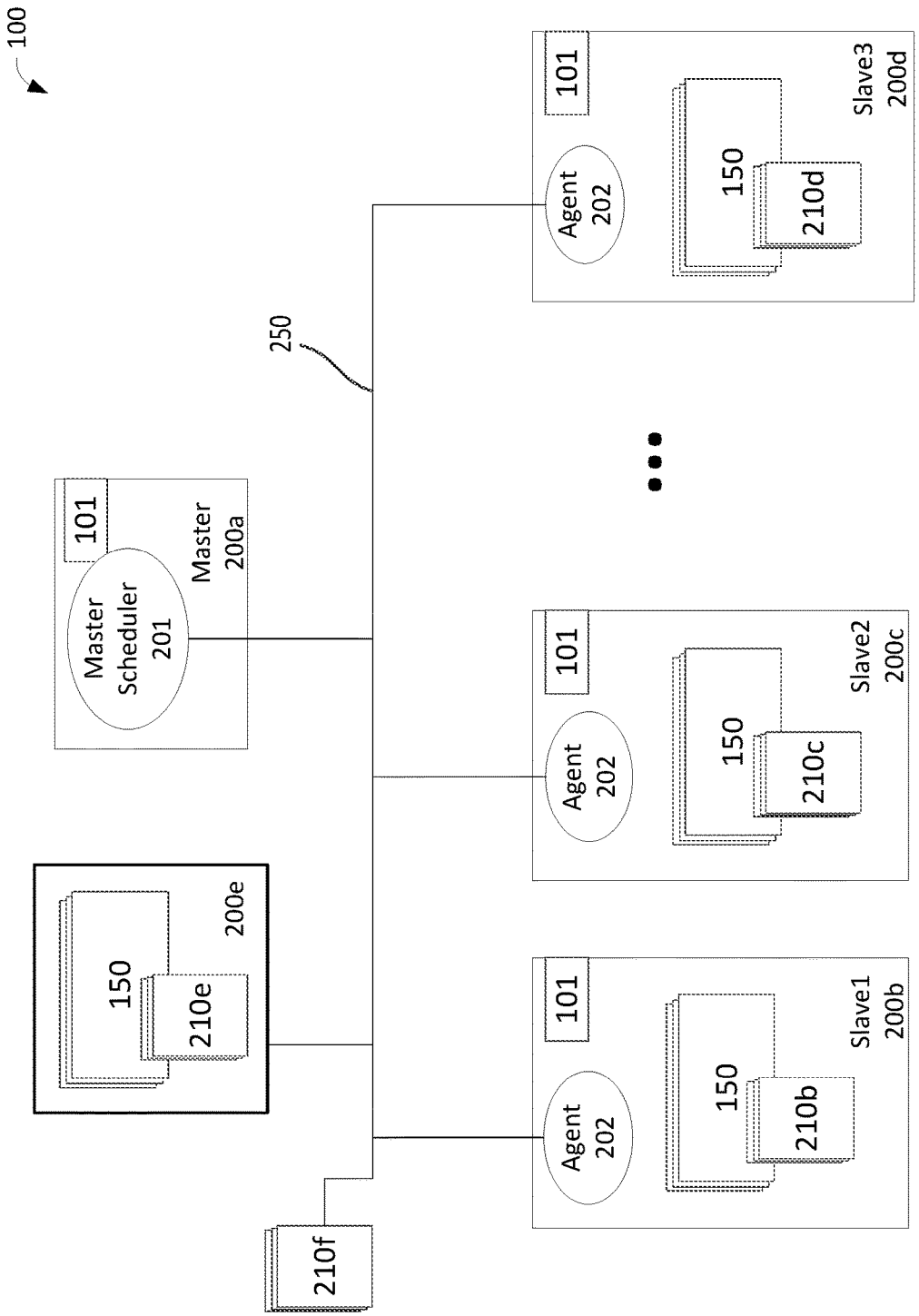
FIG. 2 is a diagram showing aspects of an example system.

FIG. 2 illustrates aspects of an example computing system 100 having multiple computing devices 200 (e.g., servers, computers, network devices). The devices 200 may be connected via any suitable connection including over communication networks. In some examples, the devices 200 may be part of a single unified system, or may be distributed such as in a cloud computing environment.

In some embodiments, the devices 200 may be physically or logically configured as master and slave devices. In other embodiments, other hierarchies or logical arrangements may be used. Any suitable physical and/or logical arrangement of DRM components can be used.

The example computing system 100 in FIG. 2 has a master machine 200a and multiple slave machines 200b, 200c, 200d, 200e. Processors 101 on the master machine 200a can be configured to run a master daemon and scheduler 201. The daemon and scheduler can be responsible for client interaction (e.g., workload submissions, queries, control), workload/resource scheduling and communicating with DRM agents.

Processors 101 on one or more of the slave machines 200b, 200c, 200d can be configured to operate at least one DRM agent. Processors 101 on the slave machines 200b, 200c, 200d can be configured, via a DRM agent or otherwise, to monitor and report resource availability and attributes to the master daemon on the master machine 200a. DRM agents can be configured to accept requests from the master daemon to execute and control workloads, and/or to monitor the life cycle of the workloads.

Although aspects of the present disclosure refer to DRM agents, daemons, masters, slaves, etc., it should be understood that DRM components and their functions, interactions, etc., may be performed by one or more processors 101 anywhere in the computing system 100 in any arrangement, structure, or division of responsibilities. For example, in some embodiments, master or slave may refer to a role or process running on a particular machine or processor. In some examples, master and slave roles can be performed by a single machine. In other examples, the DRM system may operate in a peer-to-peer fashion, as a distributed process, or otherwise.

To increase utilization of the resources 150, the computing system 100 can be configured for the concurrent operation of workloads on the same machine, and to schedule and/or allocate resources and workloads across the computing system 100.

To manage different resources 150, distributed resource managers can maintain resource attribute element sets. In some embodiments, a resource attribute element set includes an element for each of one or more resources in the computing system 100. Each element represents attribute information for a corresponding resource.

When a resource request is received by the computing system 100, a distributed resource manager can identify one or more candidate resources based on requested resource attributes and the resource attribute element sets. In some embodiments, identifying the candidate resources can include performing element-wise operations on the attribute element sets.

For example, a workload requiring a GPU and having data on Rack A may have requested resource attributes indicating that the requested resource should have a GPU and be preferably located on Rack A.

In some situations, the scheduling of workloads on resources with appropriate attributes can have a large effect on the performance (e.g. throughput) of the computing system 100. For example, when a workload is data-intensive, the location of the data relative to the machine 200 on which the workload application is running can have an impact on performance and resource usage.

For example when a workload is data-intensive, accessing data from a remote device can take time and can increase the network bandwidth and network device resources required to communicate between the machine executing the workload, and the machine hosting the data. Additionally, if machines executing the workload are waiting for data from a remote location, these processing resources are consumed for a longer period of time. Resources and the length of time these resources are consumed by a particular workload can include, but are not limited to, central processing units (CPUs), GPUs (graphics processing units), memory, network traffic/bandwidth, storage, and the like.

Generally, the closer the data to the processing resources, the better the performance that can be expected. In some embodiments, resource scheduling and requests for resources can account for this factor using different resource attributes.

Data locality, as it is sometimes known, may be classified into different levels. Node local or data local refers to the situation when a workload is executing on the same node or machine as the data; rack local refers to when a workload is executing on the same rack or within one network hop of the data location; and other or off-switch refers to when a workload is executing on a node which requires two or more network hops to reach a data location, for example via a switch or other networking device. Other levels of data locality are possible. For example, "off-switch" data that is not on the same rack as the requesting process but is located at a device on the same switch may provide better performance than data which is on a different network that is additional network hops away.

Figure 3B:
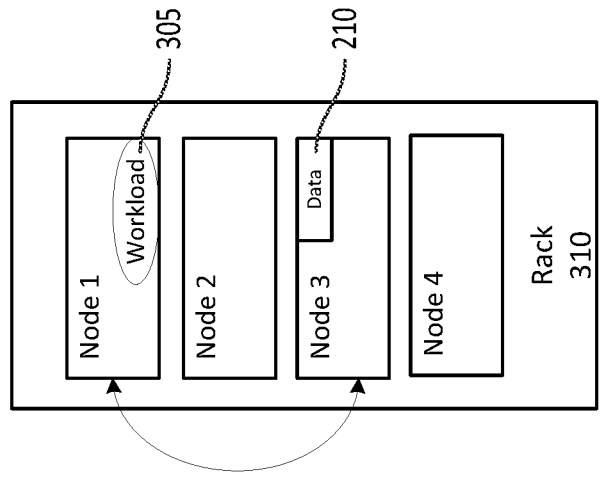
FIGS. 3A, 3B and 3C are diagrams showing examples of workloads and data at different locations in example systems.
Figure 3A:
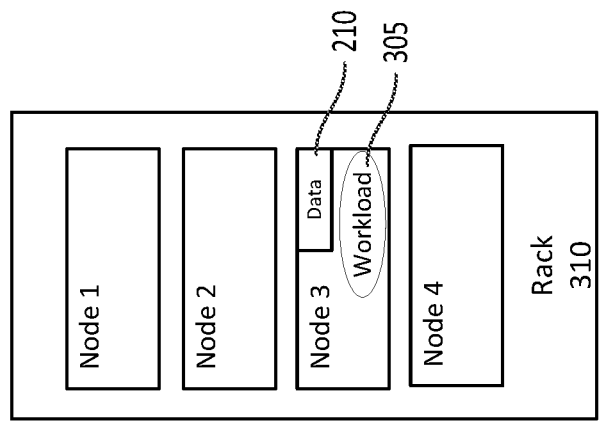
Figure 3C:
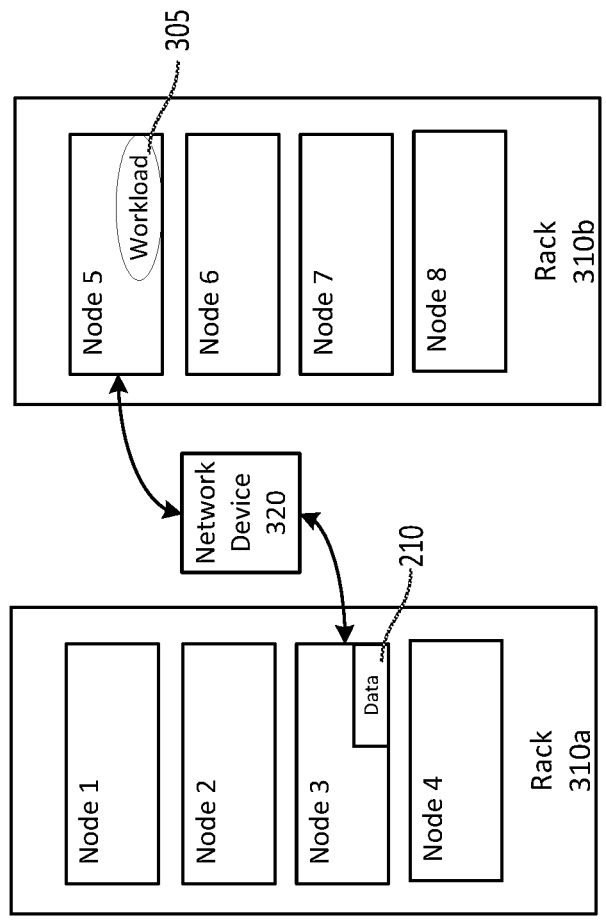

FIG. 3A illustrates an example of node locality where a workload 305 and the associated data 210 are both on Node 3. FIG. 3B illustrates an example of rack locality where the workload 305 and the data 210 are located on different nodes on the same rack. FIG. 3C illustrates an example off-switch data where the workload 305 and the associated data 210 are on different racks 310a, 310b which are separated by a network device 320 such as a switch or router.

Referring again to FIG. 2, in some example computing systems 100, resources 150 can be located at any number of physical locations, can be standalone devices, or can be part of or otherwise associated with any number of other devices 200 or systems. In some embodiments having data storage aspects, data can be located at any number of locations such as caches, memory devices, data storage devices and the like. Data can, in some examples, be stored on or otherwise associated with one or more particular resources.

Although the example resources 150 and data 210b,c,d,e,f illustrated in FIG. 2 are logically shown as being associated with machines 200a, 200b, etc., resources 150 and data 210 can be associated or grouped in any arrangement of physical/logical locations, physical/logical machines (e.g. racks, devices, backplanes), etc. In some embodiments, this location information defines one or more attributes of the corresponding resources.

In some embodiments, some resources 150 (e.g., the resources at machine 200e) may not have a local agent and may be managed by the master scheduler 201 or an agent 202 from another device. For example, in some instances, it may not be possible, practical, or desirable for a networking or storage device to have a local agent.

Data 210b,c,d,e,f may be located anywhere in or external to the computing system 100.

Resources 150, devices 200 or subsystems in the computing system 100 can be connected by one or more physical and/or logical networks 250 and network devices, or interconnections within a device/rack/etc. In some embodiments, aspects of the networks 250 themselves can be resources. For example, physical or logical connections/ports/addresses, communication bandwidths, protocols, etc.

Resources can include any number of resource types and can be modelled in any suitable manner. For example, resources in a computing system 100 can include host systems, processing units (e.g. CPU cores, GPUs), memories, storage devices, network devices, software licenses, and any other resource that can be used by a workload.

In some embodiments, resources may include attributes which classify the resources as consumable or non-consumable; as string, Boolean, or numeric resources; or by any other mechanism or combination thereof.

A Boolean attribute can refer to any resource which can be defined by a true or false value (e.g., has a value of 1 or 0). A Boolean attribute can indicate the availability of specific features or functionality. For example, a resource having a Boolean attribute can be a file server, a software package, a software version, a special-purpose device, etc. In some examples, a Boolean attribute may identify a capability such as "has a Gigabit bandwidth". If the attribute is available on the resource, the Boolean resource will have a value of true.

A numeric attribute can include any attribute which has a numeric value. A numeric attribute can indicate, for example, a quantity or capacity of the resource. For example, numeric attributes can include number of processors, memory size, amount of bandwidth, etc.

A string attribute can include any attribute which has a string value. A string attribute can include, for example, a host type (e.g., LINUX64), a host model (e.g. x86), an operating system (e.g., WINDOWS10), etc.

In some embodiments, resources 150 can be classified as consumable or non-consumable. These or other attributes can be associated with resources 150 based on class or other identifiers in the resource model. For example, based on an attribute associated with a resource 150, the DRM may manage the resource 150 as a consumable or non-consumable resource. In some embodiments, only consumable resources are continuously monitored by the DRM.

In some embodiments, resources may be modelled as composite or hierarchical resources, which can capture relationships between different types of resources. For example, a resource such as a compute server (host) may include two other resources such as a number of computational cores and an amount of memory.

Figure 4:
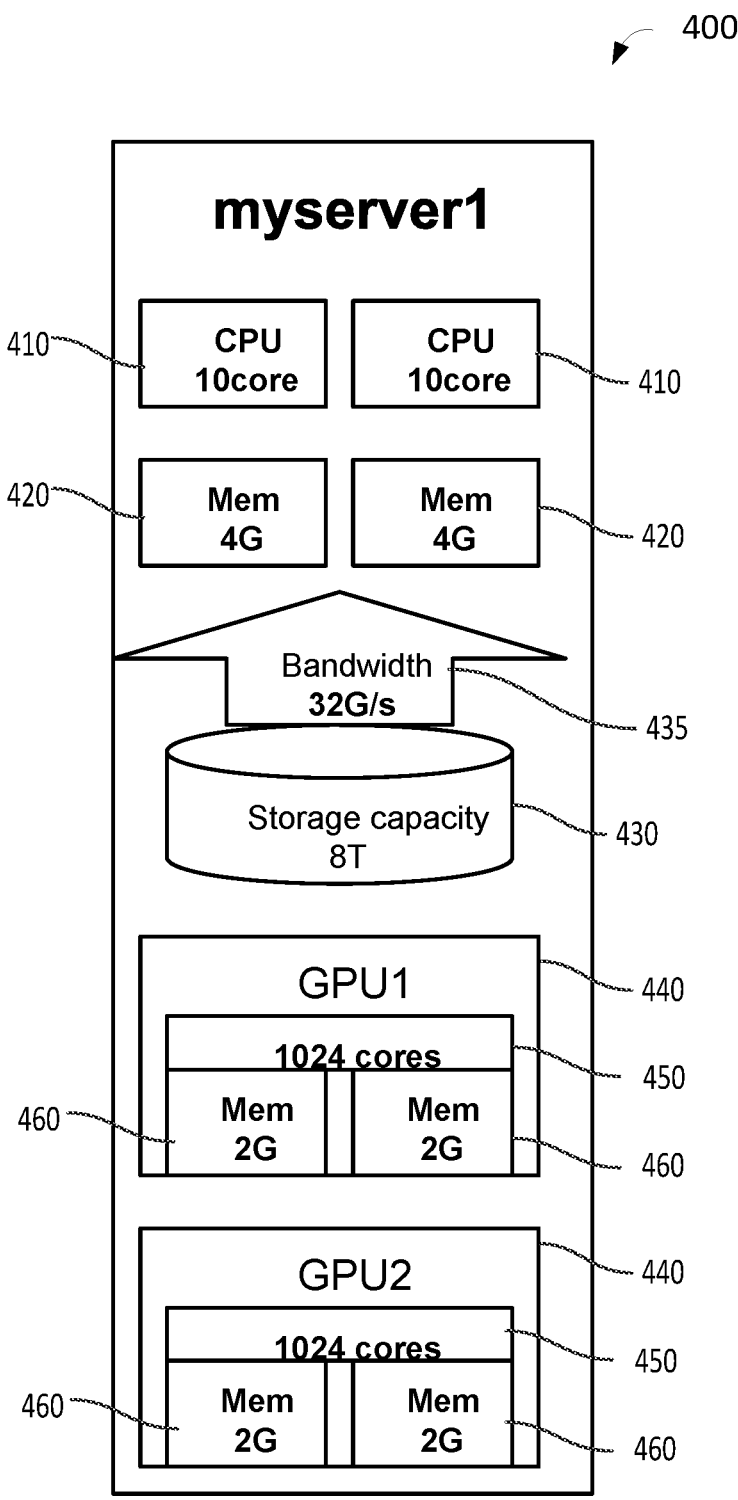
FIG. 4 is a diagram showing aspects of an example composite resource.

FIG. 4 shows a block diagram of an example compute server 400 named "myserver1". The server 400 has two CPU sockets 410. Each CPU 410 has ten cores. The server 400 also has two 4-GB memory modules 420, and an 8-TB storage 430 having a 32-Gb/s bandwidth 435. The server 400 also has two GPUs 440 named GPU 1 and GPU2, each having 1024 cores 450 and two 2-GB memory modules 460. The compute server 400 may be modelled in the distributed resource management system as a series of individual resources or as a single composite or hierarchical resource.

This non-limiting example of a compute server 400 illustrates some of the many possible resources 150 and their relationships to one another. As resources 150 and workload resource requirements become more complex, so do the modeling, scheduling and monitoring of such resources 150.

Figure 5:
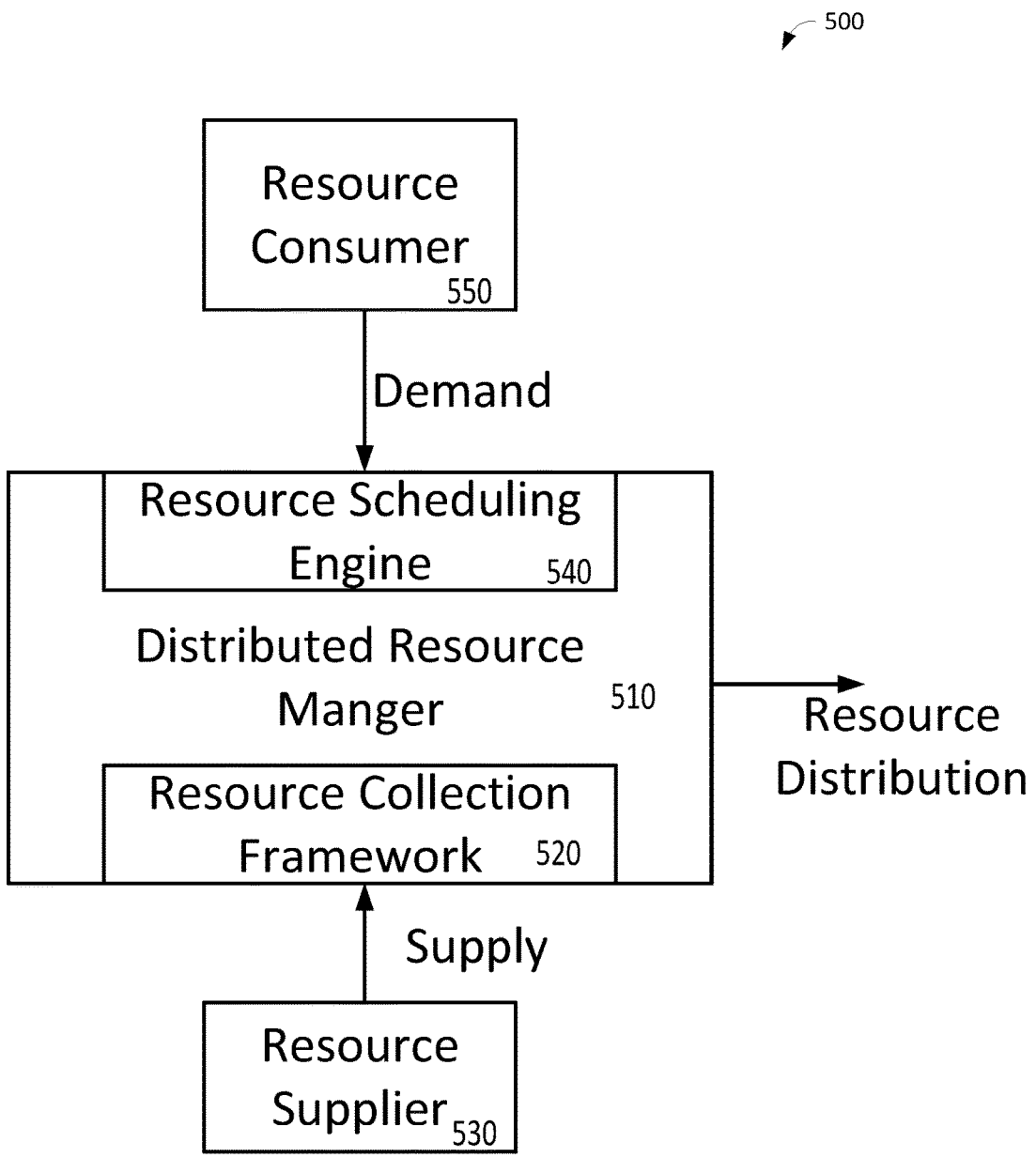
FIGS. 5 and 6 are diagrams showing aspects of example computing environments.

FIG. 5 shows aspects of an example computing environment 500 illustrating a framework for a distributed resource manager 510. In some embodiments, the DRM 510 includes a resource collection framework 520 which is configured to receive or otherwise obtain resource information (Supply) from one or more resource information suppliers 530. In some embodiments, the obtained resource information may provide the information required to generate or otherwise populate resource models for the resource suppliers.

The DRM can be configured to store or have access to one or more resource attribute element sets corresponding to one or more resources 150 in the DRM system. The DRM can generate or update the resource attribute element sets from information regarding the one or more resources.

In some embodiments, the DRM 510 includes a resource scheduling engine 540 configured to receive and manage resource requests (Demand) from one or more resource consumers 550. Received resource demands may be basic requests for resources of a particular type, but, in some instances, may also include more complicated requests or preferences for resources having different relationships or attributes encapsulated by the models described herein.

With these inputs, the DRM can be configured to identify candidate resources using the resource attribute element sets corresponding to the requested resource attributes, and schedule a workload based on the identified candidate resources.

Figure 6:
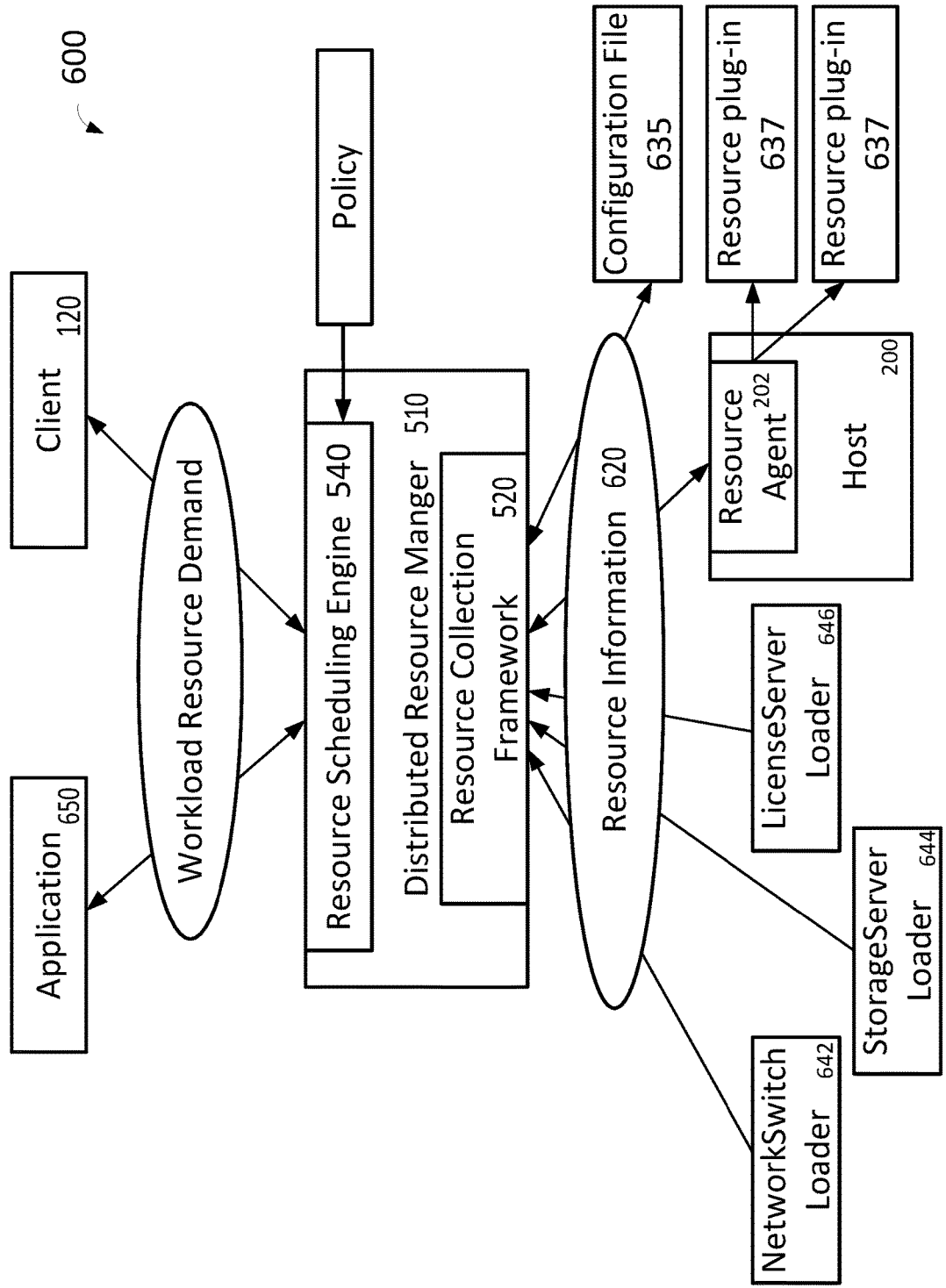

FIG. 6 shows aspects of an example computing environment 600 illustrating different examples of DRM interactions which may occur in different embodiments.

The DRM system 510 can be configured to receive or otherwise obtain resource information 620. This resource information 620 can include static and/or runtime/dynamic resource information. In some examples, the resource information 620 may include resource types, resource names, device identifiers, network addresses, resource capacities or capabilities, consumed/available resource information, resource status, resource relationships, topologies, and/or any other information associated with one or more resources.

In some embodiments, agents 202, master 201, or other DRM components at various devices in the system can be configured to collect static and/or runtime/dynamic resource information. The DRM components can be configured to transmit, communicate or otherwise make this information available to the distributed resource manager. In some examples, the DRM components can send the information to another component in the DRM system, a storage device, database or other storage location in the DRM system which is accessible by the DRM components. In some examples, the agents 202 can be configured to utilize plug-ins 637 to collect resource information.

In some embodiments, the DRM system may be configured to obtain resource information from one or more configuration files 635. In some embodiments, there may be one or more centralized configuration files including information defining the managed resources in the system. In some embodiments, the agents 202, master 201, and/or other DRM components may be configured to upload resource information to the configuration files 635.

In some embodiments, the DRM system 510 may be configured to obtain resource information from one or more loaders. For example, in some instances, some devices may not have any agent or other DRM component deployed locally (e.g., a network switch). One or more loaders can be configured to collect static information and/or runtime/dynamic information from one or more resources 150 and send or otherwise make the resource information available to the DRM system. Examples of loaders include, but are not limited to, network switch loaders 642, storage server loaders 644, and license server loaders 646.

Any one or any combination of the above-mentioned or other approaches suitable for obtaining resource information may be used. The approaches used in the DRM system may depend on the types of devices and/or resources in the computing environment.

The DRM system can be configured to manage resource requests. For example, when a workload is submitted, a client device 120 or application 650 can submit a request including information associated with one or more attributes of at least one resource required to run the workload.

In some embodiments, a resource request can include required attributes and/or preferred but non-essential attributes for a requested resource. In some examples, the requests may include ranges or thresholds for value attributes, specific resource names, or data location information.

Figure 7:
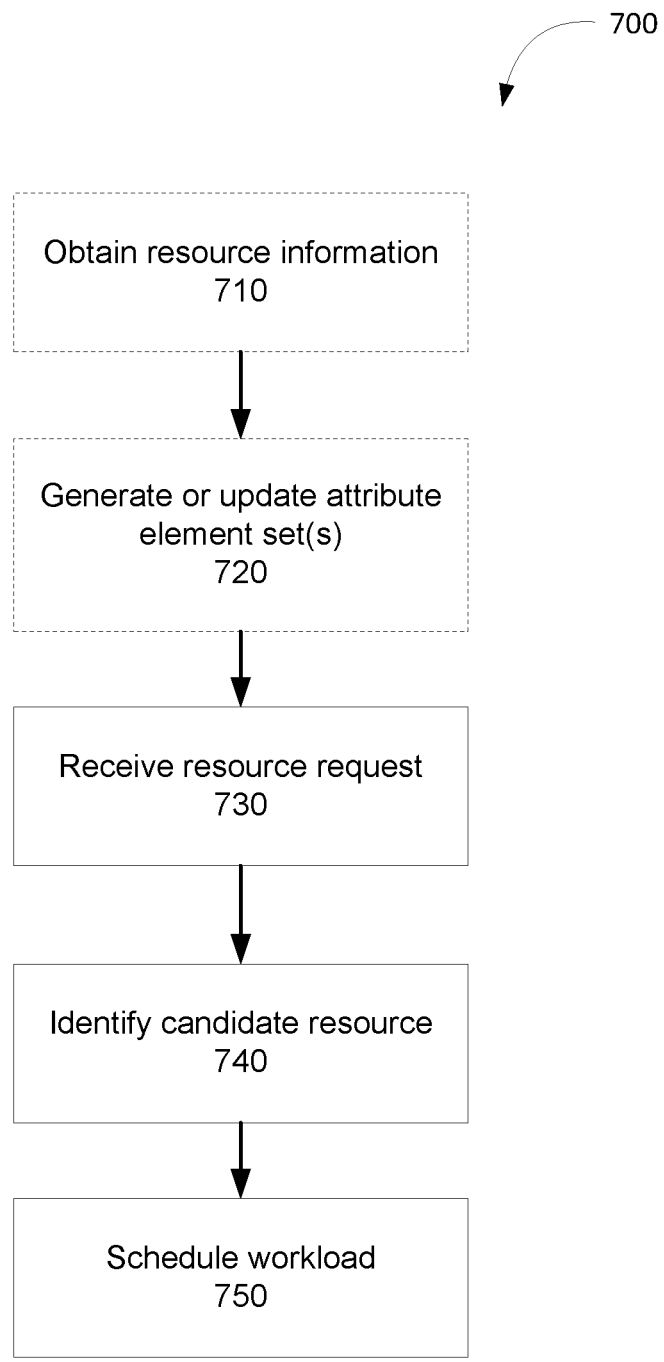
FIG. 7 is a flowchart showing aspects of an example method.

FIG. 7 is a flowchart showing aspects of an example method 700 for managing resources in a distributed resource management system.

At 710, one or more processors 101 in the DRM system obtain resource information. In some embodiments, the resource information can include information for collecting, classifying, encapsulating, defining or otherwise modelling DRM resources for management by the DRM system. In some embodiments, the resource information can include resource types, names, capacities/capabilities, identifiers, network addresses, consumed/available resource information, resource status, resource relationships, topologies, or any other information that can be used as resource attribute criteria or any information otherwise relevant to DRM management.

In some embodiments, obtaining resource information can include obtaining or monitoring resource utilization/availability. In some examples, utilization information can include a total amount of the resource being used, a total percentage of the resource being used, an amount of available resource, etc. In some embodiments, resource utilization information may be periodically or continuously obtained.

As described herein or otherwise, in some embodiments, resource information can be collected by DRM agents or other DRM components which may store or communicate the resource information to a DRM master or other DRM components. In some embodiments, the resource information may be obtained from one or more configuration files. In some embodiments, the resource information may be obtained from a loader.

The obtained resource information can include resource attribute data. In some situations, the resource attribute data can include data regarding a new resource, for example, when a new resource comes online, powers on, or otherwise becomes available for use in the DRM system.

In some situations, the resource attribute data can include data regarding a resource that is already indexed, registered, or otherwise known by the DRM system.

At 720, based on the obtained resource information, the processors 101 generate or update one or more attribute element sets. Each attribute element set provides information regarding a particular resource attribute for each indexed resource, and includes an element for each indexed resource.

In some embodiments, a resource attribute element set is a series of data elements or a data structure which includes elements for each of a number of indexed resources. Each resource attribute element set is associated with a resource attribute, and each element within an attribute element set provides information regarding the associated resource attribute for the particular resource corresponding to the index of the element.

At 730, the processors 101 receive a resource request. The resource request can be received from a client device/process, an application, or any other source. In some examples, the resource request may be part of or derived from a request to handle one or more workloads. As illustrated by the examples described herein, the resource request can include a request for a resource having one or more attributes.

In some examples, the resource request can include data for identifying attributes (e.g., name, value, status) which may be required or preferred by the requestor.

In some examples, a resource request can include attributes related to a location of the resource. For example, a resource request can include a requested attribute indicating a machine/device, rack, data center, network and/or network device at which the requested resource must be located to satisfy the request. In some embodiments, the resource request may provide a machine identifier, rack identifier, network or subnet address or any other information associated with the logical or physical location of a resource.

In other embodiments, the resource request may provide information associated with the logical or physical location of data, a memory and/or a data storage device that is to be accessed/written by the requestor (e.g. workload). For example, the resource request may indicate one or more locations or devices where data associated with the workload is to be accessed and/or written.

In some embodiments, the processors 101 may identify, generate or otherwise utilize one or more resource attribute requirements based on the data location information included in the resource request. For example, if a resource request indicates that data to be accessed is located at node A, the processors 101 may identify, generate or utilize required or optional requested resource attributes that the resource be on node A, or be on the same rack or network subnet as node A.

In some embodiments, the processors 101 may similarly generate or identify resource attribute requirements for other types of attributes.

In some embodiments, the resource request may include data identifying blacklisted attributes, or attributes which are required or preferred to not be associated with any assigned resource. For example, a resource request may include data which indicates that the resource should not be on host 3 or host 6.

At 740, processors 101 identify one or more candidate resources from the indexed resources in the DRM based on the requested resource attributes. In some embodiments, the processors 101 select and/or generate resource element sets corresponding to the resource attributes identified by the resource request.

For example, if the resource request requests a resource having a GPU and that the resource be one of host1, host2 or host4, the processors select a GPU resource element set, and generate a hostname element set that has '1', 'true', or another value for elements at the indexes corresponding to host1, host2 and host4.

If a resource request identifies an attribute which does not correspond to a currently available element set, in some embodiments, the processors 101 can generate a new resource attribute element set. In some instances, this may include obtaining additional resource information and/or parsing information already available to the DRM.

In some embodiments, the processors 101 may only generate a portion of a new resource attribute set. For example, if there is a host blacklist or whitelist, the processors may only parse/obtain the attribute resource information associated with resources which already satisfy the blacklist/whitelist. In some instances, this may reduce the amount of time required to identify candidate resources by only processing attribute resource information for a subset of the total number of resources. Similarly, if the processors 101 have already eliminated particular resources from being candidate resources based on attributes which have already been considered, the processors 101 may only parse/obtain the attribute resource information associated with resources which have not yet been eliminated from consideration.

In some embodiments, elements in an attribute element set which correspond to a resource which has been eliminated from consideration may be set to null or left empty. The processors 101, in some embodiments, may continue to populate these empty or null elements at any time. In some instances, this approach may improve performance by allowing the identification of candidate resources and subsequent scheduling to continue while the elements which are not required for the current resource request continue to be populated for potential future requests.

In some embodiments, the processors 101 may select default attribute element sets for inclusion in the candidate resource identification. For example, attribute element sets indicating whether a resource is power-on or online may be selected by default.

In some embodiments, the processors 101 perform element-wise operations on the selected and/or generated resource element sets to identify candidate resources that meet the requested resource attribute criteria. In some embodiments, the element-wise operations include performing operations on two or more attribute elements associated with a particular resource and from different selected/generated element sets.

In some embodiments, the element-wise operations between elements include logical AND and ANDNOT operations, or any other suitable logical operations. In some embodiments, performing the element-wise operations can include performing comparisons on individual elements such as string or numerical comparisons.

The result of the element-wise operations can identify any candidate resources which satisfy the attribute requirements for the resource request. For example, in some embodiments, the processors 101 generate a candidate resource element set from the element-wise operations. The candidate resource element set can have '1' or true values and indexes associated with resources which meet the request criteria.

At 750, processors 101 can be configured to schedule a workload based on the identified one or more candidate resources. In some embodiments, the processors 101 select one or more of the candidate resources for scheduling the workload. The selection may be random, based on load or capacity balancing, fairness algorithms, or any other algorithm or combination of algorithms.

In some embodiments, the identification of candidate resources before the scheduling process can reduce scheduling time by reducing the number of resources which have to be considered by more complex scheduling algorithms while still achieving effective resource matching because the initial identification of candidate resources can consider all or a significant number of resources in the system.

As illustrated by the dotted lines in FIG. 7, in some scenarios or in another embodiment, an example method 700 for managing resources in a distributed resource management system can begin at 730. In some embodiments, the attribute element sets may have been previously generated as described in the examples above with respect to 710 and 720, or by any other mechanism.

Figure 8:
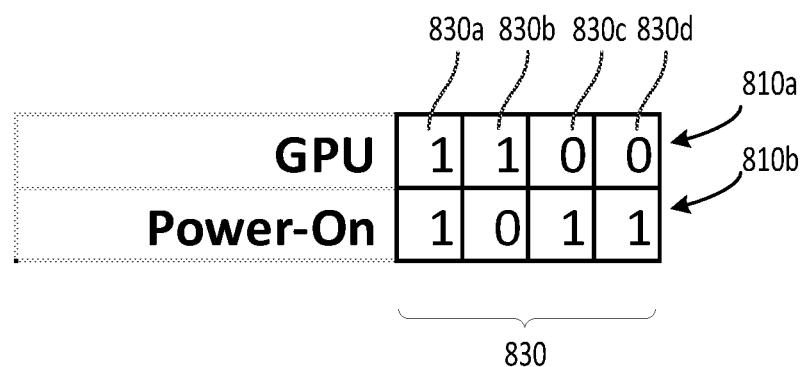
FIG. 8 is a diagram showing example resource attribute element sets.

FIG. 8 shows two example attribute element sets 810a, 810b for four resources. In this example, the first element set 810a provides information whether a resource includes a GPU. The example element set 810a includes four elements 830 with each element 830 providing attribute information of whether the corresponding resource includes a GPU. In this example, resources corresponding to the first and second indexes 830a, 830b have attribute element values of 1 indicating that they have GPUs, and resources corresponding to the third and fourth indexes 830c, 830d have attribute element values of 0 indicating that they do not have GPUs.

Similarly, with reference to the second example element set 810b, resources corresponding to the first, third and fourth indexes are powered on (have element values of '1'), and the resource corresponding to the second index is powered off (has an element value of '0').

In the example attribute element sets 810a, 810b in FIG. 8, the elements are individual bits (e.g. 0 or 1). However, in other examples, elements can be numbers, characters, strings, Boolean values, identifiers, elements selected from an enumerated set, or any other suitable data type. In some embodiments, an element at an index in an attribute element set may be empty or have a null or other similar value.

Figure 9:
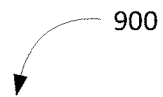
FIG. 9 is a table showing example resource information.

FIG. 9 shows a table 900 listing information for a number of resources 150 in a computing system 100. In an example scenario, when the DRM system of the computing system 100 is initialized, the DRM system may have no resource information. In some embodiments, the DRM system may have an empty resource data set, and no resource attribute element sets.

In some embodiments, the DRM system may be initialized with a number of default or standard resource attribute element sets. In some instances, these sets can be associated with commonly requested or generally required attributes. Examples of default or standard resource attributes include: whether the resource is powered-on, whether the resource has a GPU, whether the resource has a large memory, etc.

In some embodiments, the DRM system can track the next available indexes in the resource attribute element sets for one or more resource types. When the attribute element sets are empty, the next available index can be 0 or 1 or any other value referring to a first index based on the indexing scheme.

For example, if the processors 101 of the DRM system obtain resource information for Host1, the processors 101 generate or update the attribute element sets 810, resource data set 820, and indexes 840. This data which may be updated or stored in memory or on a data storage device of the computing system 100 is illustrated in FIG. 10. In this example, Host1 resource information is obtained and is stored in the resource data set 820 and is populated into elements at index 1 of the resource attribute element sets 810. In this example, the rack location of the Host1 resource is treated as another resource type and a resource attribute element set is created for Rack1, and a rack index is also created.

Upon updating the resource data set 820 and the attribute data sets 810, the index variables 840 are incremented.

With obtained information about the other example resources listed in FIG. 9, the processors 101 continue to generate or update the attribute element sets 810 and resource data sets 820. FIG. 11 illustrates the DRM resource data after the Host2 resource information is added.

FIG. 12 illustrates the DRM resource data after all eight host resources have been added. In this example, a second rack resource Rack2 is added and a new corresponding attribute element set is added when information regarding the first resource located at Rack2 is added.

Although the resources in this example are indexed using index numbers for a set of attribute elements in an array or series, in other embodiments, resource attributes may be indexed using memory addresses, linked lists, and the like.

In some embodiments, a resource may attribute elements indexed at different index locations in different attribute element sets. These different indexes for each attribute element set can be stored in the resource data set 820.

With reference to the DRM resource data illustrated in FIG. 12, an example resource request is received. The resource request includes data indicating that the requested resource must have a GPU and must not be Host3 or Host6. The processors 101 select the attribute element set associated with GPU and generate a blacklist attribute element set for the unwanted hosts.

The GPU attribute element set is "11001100". The blacklist attribute element set is generated by looking up the Serverindex values for Host3 and Host6 in the resource data set 820. These Serverindex values are 3 and 6 respectively, which creates a blacklist attribute element set of "00100100".

By performing an element-wise operation of "11001100" ANDNOT "00100100", the resulting element set is "11001000". This resulting element set indicates that the resources corresponding to the indexes having values of '1' are candidate resources. In this example, the candidate resources are Host1, Host2, and Host5. If additional resource attributes are required by a resource, additional element sets may be included in the element-wise operations.

In some embodiments, some attribute element sets may be included by default in the identification of candidate resources. For example, a power-on attribute element set may always be included in the element-wise operations. In the above example, the processors 101 would perform the element-wise operation of ANDing "10111110" with "11001000" which would generate the candidate element set of "10001000". In some embodiments, the order in which the attribute element set operations are performed may vary.

In some instances, by performing simple element-wise operations, the DRM system can check a large number of resources to determine which resources have the requested attributes in a relatively short amount of time.

In another approach without attribute element sets, resource information may be stored in a table similar to the resource data set 820 illustrated in FIG. 12. In order to determine which resources meet the requested attribute criteria, the system would have to traverse the entire resource table and individually check whether each resource matches all of the attribute criteria. In some instances, this can be a long, time-consuming process, especially as the number of resources in the system increases. In some approaches, to limit the amount of time required to traverse all of the resources in the system, only a subset of the resources are considered. However, this can result in sub-optimal scheduling and allocation of resources.

In contrast, in some embodiments, the use of attribute element sets and simple operations such as bitwise operations may be computed relatively quickly and have small incremental computational costs when a new resource is added (adding a single element to the operations). Because of this, in some instances, a large number or all of the resources in a computing system 100 may be considered.

Based on the list of candidate resources, the processors 101 schedule the workload using one or more of the candidate resources. Through the identification of candidate resources using the attribute element sets, the scheduling space for a scheduling algorithm can, in some instances, be reduced even though all of the resources have been considered. This smaller scheduling space can result in faster and potentially more optimal scheduling. In some instances, this may improve the throughput and/or performance of the DRM system.

In a system configured to consider data locality, any number of data-locality-aware scheduling algorithms can be applied by the processors on the identified candidate resources. For example, fairshare and capacity schedulers may attempt to distribute a resource 150 fairly between different users and/or organizations. In some embodiments, delay scheduling, Quincy scheduling, probability based scheduling, and/or balance-reduce scheduling may be applied to the candidate resources.

In the examples above, the elements of the attribute element sets are illustrated as bits. In most instances, using bits is the most memory efficient (e.g. an attribute for 15,000 resources can be modelled using only 15,000 bits), and may have the fastest element-wise operation computation times. However, in other embodiments, the elements can be numbers, characters, strings, Boolean values, identifiers, elements selected from an enumerated set, or any other suitable data type.

For example, the processors 101 can generate and maintain an attribute element set for the amount of memory. Wth reference to FIG. 9, the attribute element set may be {128, 128, 64, 64, 64, 64, 64, 64}. If a resource request requires a resource with 128 GB of memory, in some embodiments, the processors can do an element-wise comparison of the require attribute and the elements of the memory attribute set. This would generate a new attribute element set of {1, 1, 0, 0, 0, 0, 0, 0} representing the attribute of having 128 GB of memory. This attribute element set can be used in a subsequent element-wise operation and/or can be stored as an attribute element set for future resource requests.

In some embodiments, the processors 101 can generate multiple attribute element sets for memory size or another attribute. For example, the processors 101 can generate a "has 128 GB of memory" attribute set {1, 1, 0, 0, 0, 0, 0, 0}, and a "has 64 GB of memory" attribute set {1, 1, 1, 1, 1, 1, 1, 1} in anticipation of resource requests for different amounts of memory.

In some embodiments, a resource request may include data identifying required resource attributes and preferred or optional resource attributes. To handle such a request, the DRM system processors 101 first generate a candidate resource element set by identifying and performing element-wise operations on the attribute element sets corresponding to the required resource attributes.

With this candidate resource element set, the processors then identify and perform element-wise operations using attribute element sets corresponding to one or more of the optional resource attributes. In some embodiments, the attribute element sets associated with the different optional attributes are applied sequentially. In some examples, this sequence is based on a weighting or importance factor attributed to the attribute. In some examples, these weightings are based on the type of workload and in some instances, may be included in the resource request or may be stored at or determined by the DRM system.

If application of one of the optional attribute element sets results in an empty candidate set, the processors, in some embodiments, revert to the previous non-empty candidate resource set and continue evaluating any additional optional attributes.

Figure 13:
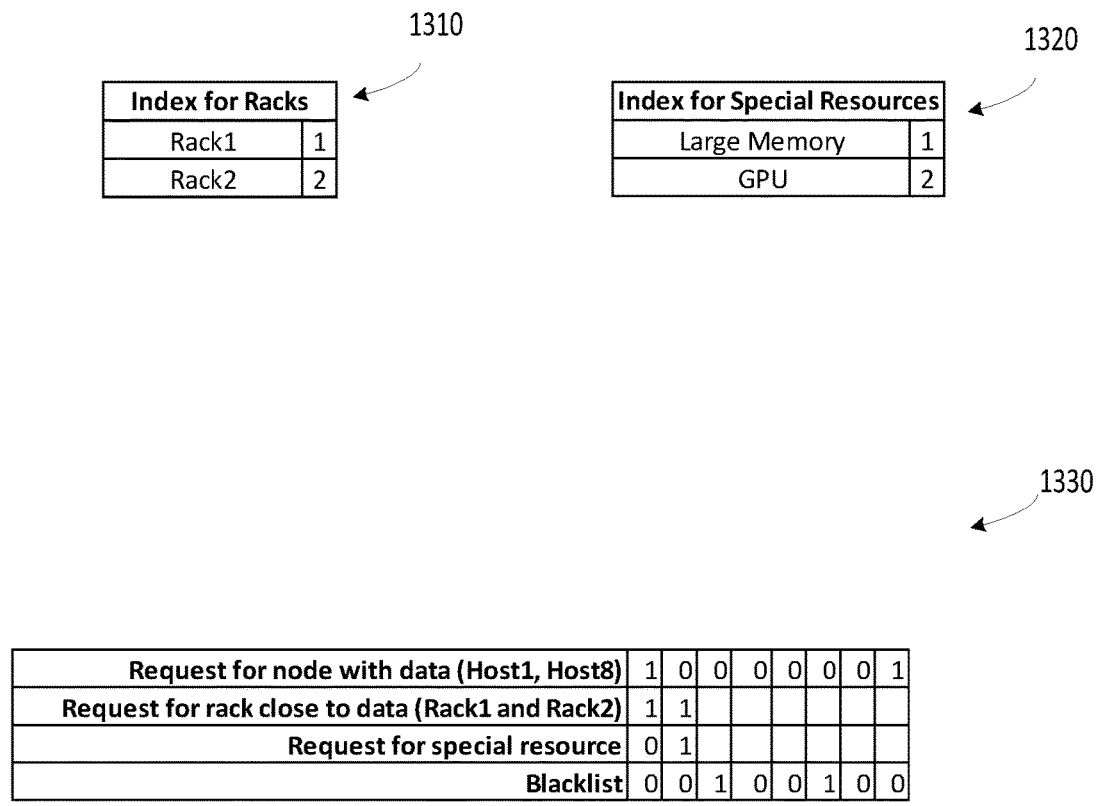

Wth reference to FIG. 13, in some embodiments, a resource request can be modelled using requested element sets. The DRM system can maintain index lists for different types of requested attributes. For example, the index lists can include an index for Racks 1310 to provide a mapping of different racks to their element indexes, or an index of special resources 1320 to provide a mapping of different special resources to their element indexes.

As illustrated by the example request element sets 1330, for a resource request including attributes requiring that the resource be close to the data on Rack1 or Rack2, the processors may generate from or receive from the information in the request an element set {1, 1} which corresponds to the indexes in the index list 1310, and also corresponds to the attribute element sets 810 for Rack1 {1, 1, 1, 1, 0, 0, 0, 0} and Rack2 {0, 0, 0, 0, 1, 1, 1, 1} in FIG. 12. Similarly, the request for special resource request element set 1330 {0, 1} corresponds to index 2 in the index list 1320, which identifies the GPU attribute element set {1, 1, 0, 0, 1, 1, 0, 0}.

As described in the examples above, each resource corresponds to a unique index for each attribute element set. In cloud-based or other potentially dynamic environments, at any time, resources may be added or removed from the computing system 100 while the system is in operation. In some embodiments, the processors 101 may be configured to remove offline resources and their indexes, create new indexes for new resources, remap any resource requests already in the system, and/or communicate any index changes to any requestor devices/processes and/or any resource information obtaining devices/processes.

For example, with reference to the resource data illustrated in FIG. 12, if Host2 is removed, the processors 101 remove Host2 from the resource data set 820. The processors 101 then renumber or otherwise regenerate resource indexes for one or more of the remaining resources.

In some embodiments, the resource having the largest index can be reassigned to the removed index. In some situations, this may minimize the amount of renumbering required. As illustrated in FIG. 14, the Serverindex for Host8 has been changed to 2 in the resource data set 820*x*, the elements previously at index=8 in the attribute element sets 810*x* has been moved to index=2, and the nextServerindex 840*x* has been decremented.

Received but not yet processed resource requests which have been indexed based on the previous indexing state (with Host2 still indexed) are also updated as illustrated by the request element set 1330*x*.

Figure 15:
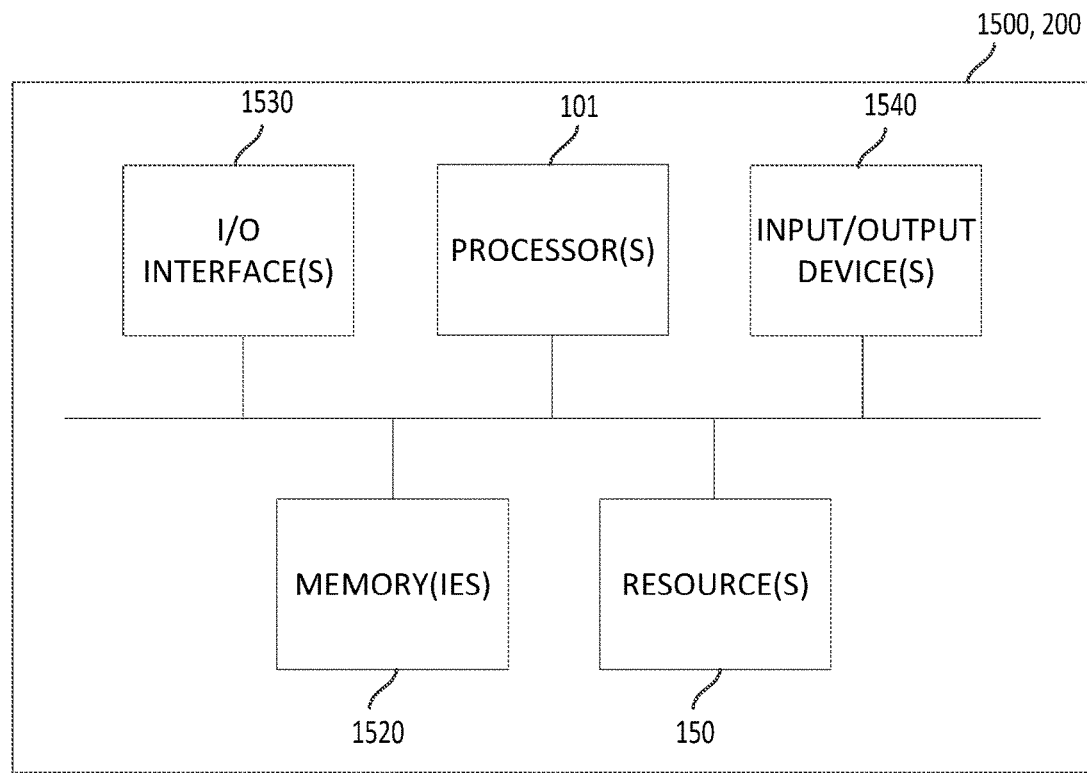
FIG. 15 is a diagram showing aspects of an example system or device.

FIG. 15 shows a schematic diagram of an example computing system 1500 or example devices 200 for managing resources 150.

In some embodiments, the computing system 1500 or devices 200 may include one or more processors 101, memory devices 1520, input/output interfaces 1530, input devices 1540, resources 150 and/or any other components or mechanisms suitable for or involved in performing aspects of the methods and functions described herein.

In some embodiments, the computing system 1500 may include one or more devices 200 or systems which provide the mechanisms, controls, devices and/or communication links to perform aspects of the methods and functions described herein. For example, the computing system 1500 may include one or more computers, servers and control devices configured for running workloads or for accessing, controlling, monitoring or otherwise utilizing resources 150. In some embodiments, an example device 200 or computing system 1500 may be a standalone computer, server, mobile device, mainframe, supercomputer, computing array or other computing device or devices configured for executing workloads and/or managing resources.

In some embodiments, a resource 150 may be specific to a particular device and may only be utilized by workloads on that device 200. Some resources 150 may be shared resources 150 which can be accessed and/or utilized by workloads executing on different devices. Resources 150 may be elastic or non-elastic. Elastic resources may be resources 150 which a workload may utilize in a time-sharing fashion or will not hold for its entire life cycle. Examples of elastic resources include CPU cycles and network bandwidth.

Non-elastic resources may include resources 150 which once allocated to a workload cannot be shared or used by other workloads unless the first workload completes or proactively releases the resource 150. Examples of non-elastic resources include volatile memory, storage device space, swap space, and software licenses.

The resources 150 may be accessed, monitored, or utilized via one or more connections such as internal busses or signal lines, or via a communication interface and/or network.

Each processor 101 may be, for example, any type of general-purpose microprocessor or microcontroller, a central or graphics processing unit, a digital signal processing (DSP) processor, an integrated circuit, a field programmable gate array (FPGA), a reconfigurable processor, a programmable read-only memory (PROM), or any combination thereof.

Memory or storage devices 1520 may include one or a combination of any type of computer memory that is located either internally or externally (e.g., networked or peripheral), for example, hard drives, flash memory, solid state memory, network storage devices, random-access memory (RAM), cache memory, read-only memory (ROM), Blu-Ray™ or compact disc read-only memory (CDROM), electro-optical memory, magneto-optical memory, erasable programmable read-only memory (EPROM), and electrically-erasable programmable read-only memory (EEPROM), Ferroelectric RAM (FRAM), non-transitory computer readable media or the like. The memory(ies) and storage provided by these devices may be resources managed by the computing system 1500.

In some examples, memory devices 1520 may include data or instruction sets for implementing, controlling or instructing DRM components, workloads and/or resources. The memory devices 1520 may also include instructions or code for configuring one or more processors and other components of the device 200 or computing system 1500 to perform any of the methods and functions described herein.

Some input/output (I/O) interfaces 1530 can enable a device 200 or system 10 to interconnect with one or more input devices, such as a keyboard, mouse, camera, touch screen and a microphone, or with one or more output devices such as a display screen or a speaker. In some embodiments, I/O interfaces 1530 can also include network interfaces which enable devices 200 or aspects of the computing system 1500 to communicate with other components (such as other devices, DRM components or resources), to exchange data with other components, to access and connect to network resources, to serve applications, and to perform other computing applications by connecting to one or more wired or wireless networks capable of carrying data including the Internet, Ethernet, plain old telephone service (POTS) line, public switched telephone network (PSTN), integrated services digital network (ISDN), digital subscriber line (DSL), coaxial cable, fiber optics, satellite, mobile, wireless (e.g., WMAX), SS7 signaling network, Bluetooth™, near field communication (NFC), fixed line, local area network, wide area network, busses and others, including any combination of these.

In some examples, one or more I/O interfaces 1530 may enable a device 200 or computing system 1500 to communicate, instruct, control, monitor or otherwise interconnect with a resource 150 or another device or system.

In some embodiments, devices 200 and/or computing system 1500 may include input or output devices such as keyboard, mouse, camera, touch screen, microphone, displays, etc. For example, a computing device or printing device may include a keypad, touchscreen, or other integrated, peripheral or linked input or output device. The input devices may be configured to receive instructions to run workloads or to change DRM settings. The output devices may be configured to display or otherwise output workload results, workload statuses, resource information, etc.

In some instances, aspects of some embodiments described herein may consider all resources in a system to reduce the number of candidate resources for scheduling workloads. In some scenarios, this may reduce the scheduling time while potentially increasing performance factors such as throughput and data locality metrics.

Through simulations, it has been observed that an example system based on the attribute element sets described herein had a higher cluster throughput than a capacity algorithm scheduler. The throughput advantage of the attribute element set approach increased as the number of nodes in the system increased from 200 to 10000.

It was also observed that an example system based on the attribute element sets described herein had a higher node-local data locality hit rate than a scheduler based on a capacity or fair algorithm.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing a plurality of resources of a computing system, the method comprising:
   receiving, at a distributed resource management system configured to manage the plurality of resources of the computing system, a request for a resource of the computing system, the request including data specifying at least one requested resource attribute for the requested resource;
   identifying, at the distributed resource management system, one or more candidate resources of the computing system from the plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling, at the distributed resource management system, a workload associated with the request for execution based on the one or more identified candidate resources.

2. The method of claim 1 comprising:

obtaining, at the distributed resource management system, resource attribute data regarding one or more of the plurality or resources; and generating, at the distributed resource management system, or updating at least one of the resource attribute element sets based on the obtained resource attribute data.

3. The method of claim 1 comprising:

obtaining, at the distributed resource management system, resource attribute data for a new resource;

based on the obtained resource attribute data, adding, at the distributed resource management system, a new element at a new resource index in each attribute element set; and storing, at the distributed resource management system, the new resource index in a resource data set in association with the new resource.

4. The method of claim 3, comprising:

when the resource attribute data for the new resource includes data representing an attribute not currently associated with an attribute element set, generating, at the distributed resource management system, a new attribute element set and adding a new element at the next resource index in the new attribute element set.

5. The method of claim 1, wherein one or more of the resource attribute element sets are bitsets, and identifying, at the distributed resource management system, the one or more candidate resources comprises performing bit-wise operations on one or more of the resource attribute element sets.

6. The method of claim 1, wherein the request includes data identifying at least one of: a node, a rack or a data center at which data required by the workload associated with the request is located.

7. The method of claim 1, wherein when the request identifies at least one required resource attribute and at least one optional resource attribute, identifying, at the distributed resource management system, the one or more candidate resources from the plurality of resources comprises:

generating, at the distributed resource management system, an attribute resource candidate element set by performing element-wise operations on one or more resource attribute element sets corresponding to the at least one required resource attribute; and performing, at the distributed resource management system, element-wise operations on the attribute resource candidate element set and at least one of the resource attribute sets corresponding to the at least one optional resource attribute.

8. The method of claim 1 comprising identifying, at the distributed resource management system, the one or more candidate resources from the plurality of resources by performing element-wise operations on the one or more resource attribute element sets corresponding to the at least one requested resource attribute, and default attribute element sets.

9. The method of claim 1, wherein the at least one requested resource attribute includes a resource location, a network address, a resource status, or a resource capability.

10. A computing system comprising:

at least one processor for executing instructions of a distributed resource management system of the computing system, wherein execution of the instructions of the distributed resource management system by the at least one processor causes the disturbed resource management system to manacle a plurality of resources of the computing system by:

receiving a request for a resource of the computing system, the request including data specifying at least one requested resource attribute for the requested resource;

identifying one or more candidate resources of the computing system from the plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling a workload associated with the request for execution based on the one or more identified candidate resources.

11. The system of claim 10 wherein execution of the instructions of the distributed resource management system by the at least one processor causes the disturbed resource management system to further manacle the plurality of resources of the computing system by:

obtaining resource attribute data regarding one or more of the plurality or resources; and generating or updating at least one of the resource attribute element sets based on the obtained resource attribute data.

12. The system of claim 10 wherein execution of the instructions of the distributed resource management system by the at least one processor causes the disturbed resource management system to further manacle the plurality of resources of the computing system by:

obtaining resource attribute data for a new resource;

based on the obtained resource attribute data, adding a new element at a new resource index in each attribute element set; and storing the new resource index in a resource data set in association with the new resource.

13. The system of claim 12 wherein execution of the instructions of the distributed resource management system by the at least one processor causes the disturbed resource management system to further manacle the plurality of resources of the computing system by:

when the resource attribute data for the new resource includes data representing an attribute not currently associated with an attribute element set, generating a new attribute element set and adding a new element at the next resource index in the new attribute element set.

14. The system of claim 10, wherein one or more of the resource attribute element sets are bitsets, and identifying the one or more candidate resources comprises performing bit-wise operations on one or more of the resource attribute element sets.

15. The system of claim 10, wherein the request includes data identifying at least one of: a node, a rack, or a data center at which data required by the workload associated with the request is located.

16. The system of claim 10, wherein when the request identifies at least one required resource attribute and at least one optional resource attribute, identifying the one or more candidate resources from the plurality of resources comprises:

generating an attribute resource candidate element set by performing element-wise operations on one or more resource attribute element sets corresponding to the at least one required resource attribute; and performing element-wise operations on the attribute resource candidate element set and at least one of the resource attribute sets corresponding to the at least one optional resource attribute.

17. The system of claim 10 wherein the at least one processor is configured for: identifying the one or more candidate resources from the plurality of resources by performing element-wise operations on the one or more resource attribute element sets corresponding to the at least one requested resource attribute, and default attribute element sets.

18. The system of claim 10, wherein the at least one requested resource attribute includes a resource location, a network address, a resource status, or a resource capability.

19. A non-transitory, computer-readable medium or media having stored thereon computer-readable instructions of a distributed resource management system, wherein execution of the instructions of the distributed resource management system by at least one processor causes the distributed resource management system to be configured to manage a plurality of resources of a computing system by system:

receiving a request for a resource of the computing system, the request including data specifying at least one requested resource attribute for the requested resource;

identifying one or more candidate resources of the computing system from the plurality of resources by performing element-wise operations on one or more resource attribute element sets corresponding to the at least one requested resource attribute, each resource attribute element set comprising an element for each of the plurality of resources, each element representing a resource attribute for a respective resource of the plurality of resources; and scheduling a workload associated with the request for execution based on the one or more identified candidate resources.

20. The medium or media of claim 19, wherein one or more of the resource attribute element sets are bitsets, and identifying the one or more candidate resources comprises performing bit-wise operations on one or more of the resource attribute element sets.

* * * * *